United States Patent [19]

Takaoka

[11] Patent Number: 5,937,099
[45] Date of Patent: Aug. 10, 1999

[54] COLOR IMAGE TRANSMISSION WITH SEPARATE PROCESSING OF BINARY AND MULTI-LEVEL DATA

[75] Inventor: Makoto Takaoka, Kawasaki, Japan

[73] Assignee: Canon Kabushiki Kaisha, Tokyo, Japan

[21] Appl. No.: 08/785,965

[22] Filed: Jan. 22, 1997

Related U.S. Application Data

[62] Division of application No. 08/763,632, Dec. 4, 1996, which is a continuation of application No. 08/164,845, Dec. 9, 1993, abandoned, which is a continuation of application No. 07/630,817, Dec. 20, 1990, abandoned.

[30] Foreign Application Priority Data

Dec. 29, 1989 [JP] Japan ..................................... 1-343118

[51] Int. Cl.$^6$ .............................. H04N 1/64; H04N 1/41; G06T 9/00
[52] U.S. Cl. .......................... 382/239; 382/166; 358/539; 358/429; 358/430; 358/261.2
[58] Field of Search ..................................... 382/239, 166, 382/244, 245, 246, 247, 248, 250, 282; 358/261.1, 261.2, 261.3, 427, 429, 430, 432, 433, 539, 453

[56] References Cited

U.S. PATENT DOCUMENTS

| | | | |
|---|---|---|---|
| 4,020,462 | 4/1977 | Morrin, II | 382/232 |
| 4,674,861 | 6/1987 | Kawamura . | |
| 4,922,349 | 5/1990 | Abe et al. | 358/443 |
| 4,959,868 | 9/1990 | Tanioka . | |
| 5,014,198 | 5/1991 | Umemura | 382/232 |
| 5,162,925 | 11/1992 | Takaoka et al. | 358/447 |
| 5,483,358 | 1/1996 | Sugiura et al. | 358/508 |
| 5,706,368 | 1/1998 | Mita | 358/539 |
| 5,754,697 | 5/1998 | Fu et al. | 382/232 |

FOREIGN PATENT DOCUMENTS

| | | | |
|---|---|---|---|
| 96219 | 12/1983 | European Pat. Off. | H04N 1/40 |
| 1-144778 | 6/1989 | Japan | H04N 1/41 |
| 2151106 | 7/1985 | United Kingdom | H04N 1/32 |

OTHER PUBLICATIONS

Mastering Wordperfect 3.1, 1989.
Digital Image Processing Technique, Academic Press, Inc., pp. 216–218, 1984, Ekstrom.
"Combined Symbol Matching Facsimile Data Compression System", Proceedings of the IEEE, vol. 68, No. 7, pp. 786–796, Jul. 1980, Pratt et al.

Primary Examiner—Scott Rogers
Attorney, Agent, or Firm—Fitzpatrick, Cella, Harper & Scinto

[57] ABSTRACT

A color image transmitting method for transmitting a color image composed of a color image portion and a binary image portion is disclosed. Data about the color image portion and data about the binary portion are separated from each other by the positional data so as properly to be compressed or encoded respectively. The data about the color image portion, data about the binary image portion and positional data about one or both of the two image portions are successively transmitted so that the color image can efficiently be transmitted.

14 Claims, 18 Drawing Sheets

STATUS OF IMAGE TRANSMITTED

VECTOR INFORMATION

Marker

BINARY
COMPRESSED DATA

Marker

MULTI-LEVEL
COLOR IMAGE DATA

F I G. 9

IMAGE OF MIXTURE OF CHARACTERS AND A COLOR IMAGE

LAP TOP PERSONAL COMPUTER

SINCE A LAP TOP PERSONAL COMPUTER WAS DEVELOPED TO REDUCE THE SIZE AND WEIGHT OF THE APPARATUS, EARLY MODELS COMPRISED ONE 3.5-INCH FDD.

IMAGE OF EXTRACTED MULTI-LEVEL COLOR IMAGE

IMAGE OF MIXTURE OF CHARACTERS AND COLOR IMAGE
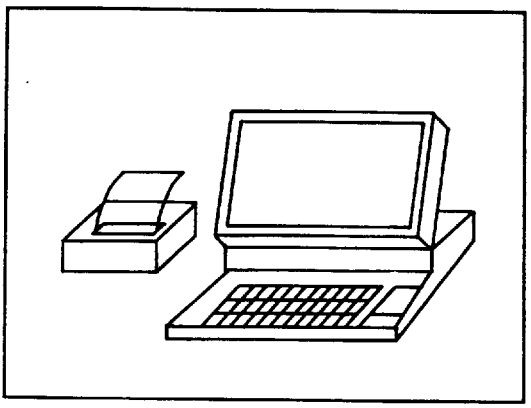
LAP TOP PERSONAL COMPUTER
SINCE A LAP TOP PERSONAL COMPUTER WAS DEVELOPED TO REDUCE THE SIZE AND WEIGHT OF THE APPARATUS, EARLY MODELS COMPRISED ONE 3.5-INCH FDD.
F I G. 11A

IMAGE FROM WHICH UNNECESSARY COLOR IMAGE
HAS BEEN DELETED

LAP TOP PERSONAL COMPUTER

SINCE A LAP TOP PERSONAL COMPUTER WAS DEVELOPED TO REDUCE THE SIZE AND WEIGHT OF THE APPARATUS, EARLY MODELS COMPRISED ONE 3.5-INCH FDD.

IMAGE FINALLY PRINTED

LAP TOP PERSONAL COMPUTER

SINCE A LAP TOP PERSONAL COMPUTER WAS DEVELOPED TO REDUCE THE SIZE AND WEIGHT OF THE APPARATUS, EARLY MODELS COMPRISED ONE 3.5-INCH FDD.

PROCESSING OF DATA OF MULTI-LEVEL
COLOR IMAGE PORTION
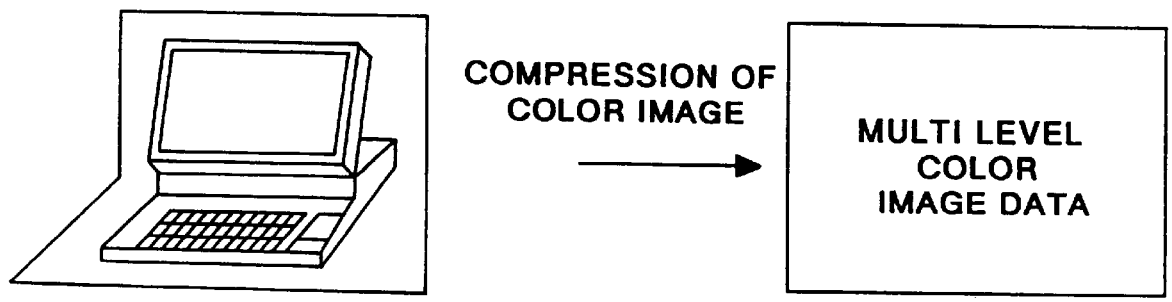
F I G. 12B

COLOR IMAGE TRANSMISSION WITH SEPARATE PROCESSING OF BINARY AND MULTI-LEVEL DATA

This application is a division of application Ser. No. 08/763,632 filed Dec. 4, 1996 which was a continuation of application Ser. No. 08/164,845 filed Dec. 9, 1993, now abandoned, which was a continuation of application Ser. No. 07/630,817 filed Dec. 20, 1990, also now abandoned.

BACKGROUND OF THE INVENTION

1. Field of the Invention

The present invention relates to a color image transmitting method in a color facsimile machine for transmitting color image data by utilizing a public line or the like.

2. Description of the Related Arts

Hitherto, there has been a method of transmitting a color original document through a digital public line or ISDN arranged in such a manner that the data about the overall color original document is processed as color image data and the data, the whole document, is thereby transmitted as it is. However, when a full set of image data of a A4 (219.46 mm×297 mm) sized original document is transmitted through a line having 64 Kbps in line speed in the form of, for example, an RBG color image, it takes 739.9 seconds (12 minutes and 19.09 seconds) in a case of a binary data image of a line density of 400 dpi. What is even worse, in a case of a multivalued data image, it takes 5919.3 seconds (98 minutes and 39.03 seconds).

Therefore, a variety of color image data compression methods have been disclosed in which a color image is compressed by a variety of methods so as to be transmitted. As examples of color image compression methods of the type described above, there have been a vector quantizing method in which the image is replaced by sets of predetermined patterns and an ADCT (Adaptive Discrete Cosine Transform) which is an orthogonally conversion encoding method.

However, the above-described method in which the overall portion of the original document is transmitted as it is encounters a problem in terms of practical use since it takes an excessively long time except for a case in which accurate image data is desired to be received by the receipt side so as to have it stored in a storage.

On the other hand, the image transmission method in which an image compression is performed exhibits an advantage in that the quantity of data can be significantly reduced and the time necessary to transmit the image can be shortened if the image is compressed in accordance with a proper algorithm. However, partial loss of image information cannot be prevented by a properly selected compressing technology when the compression ratio is raised. Furthermore, another problem arises in that image data about an image which considerably changes, a smooth image, an image containing human skin and an image including characters cannot efficiently and satisfactorily be compressed.

SUMMARY OF THE INVENTION

Accordingly, an object of the present invention is to provide an image transmitting method capable of efficiently transmitting an image.

An aspect of the present invention lies in a color image transmitting method for transmitting a color image composed of a multi-level color image portion and a binary image portion, comprising the step of successively transmitting positional data about two image portions, compressed data about the multi-level color image portion and compressed data about the binary image portion obtained by replacing the multi-level color image portion with blank.

Furthermore, the positional data is transmitted before the data about the multi-level color image portion and the data about the binary image portion are transmitted.

Another object of the present invention is to provide an apparatus capable of separating a binary image portion from a multi-level image portion and transmitting the data about these image portions respectively and efficiently.

Further object of the present invention is to provide an apparatus capable of transmitting image data composed of multi-level color image data and binary image data satisfactorily and efficiently.

Other and further objects, features and advantages of the invention will be appear more fully from the following description.

BRIEF DESCRIPTION OF THE DRAWINGS

FIG. 9 illustrates the sequential order of image data, to be transmitted by the apparatus shown in FIG. 1;

FIGS. 11A to 11D respectively illustrate the operation according to the embodiment of the present invention; and FIGS. 12A to 12B respectively illustrate an area of compressing binary image data and an area of compressing multi level color image data.

DESCRIPTION OF THE PREFERRED EMBODIMENTS

The Structure of an Apparatus According to this Embodiment

Figure 1:
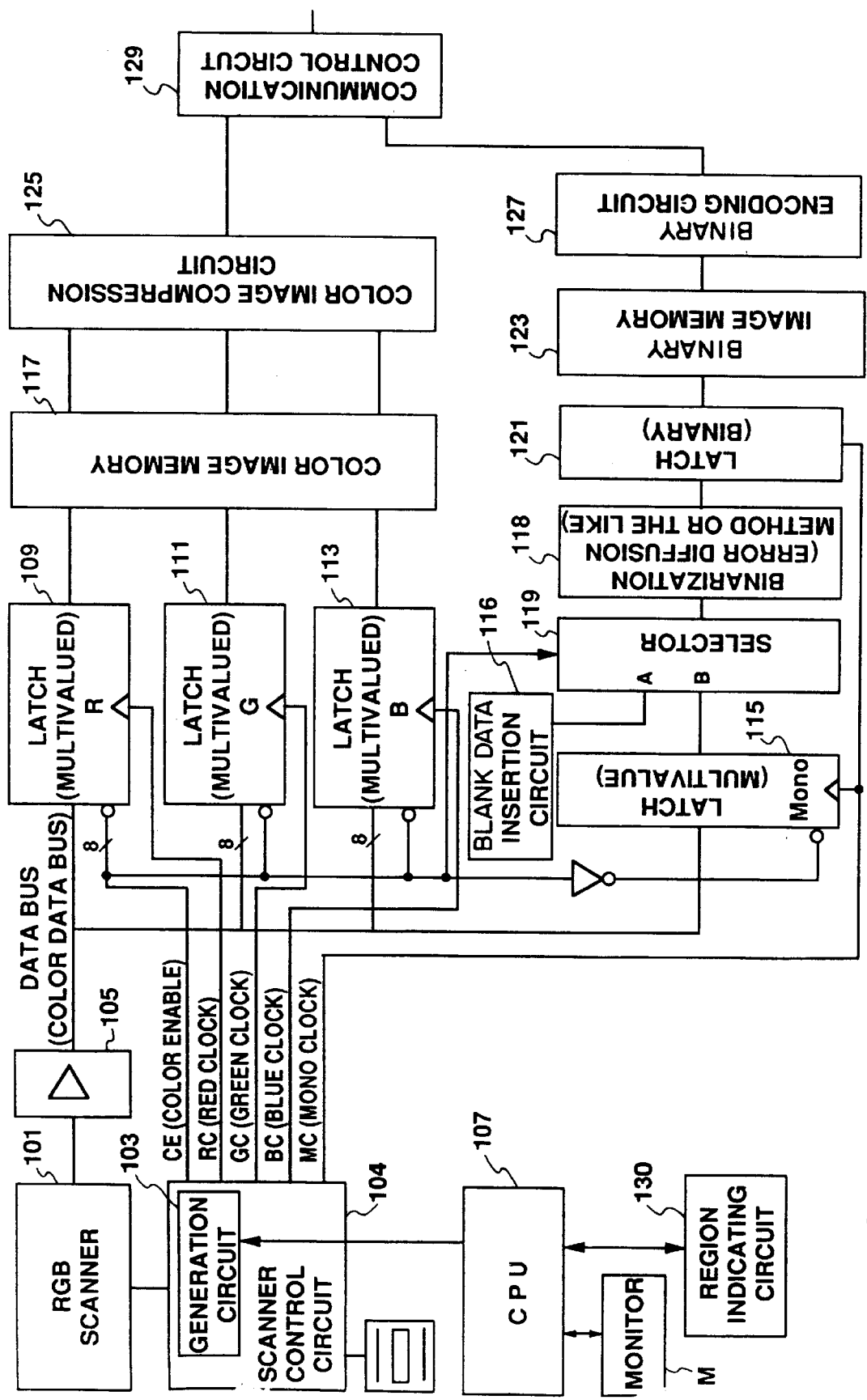
FIG. 1 is a schematic block diagram which illustrates the structure of an apparatus according to an embodiment of the present invention.

FIG. 1 is a structural view which illustrates an apparatus according to the present invention.

Referring to FIG. 1, reference numeral 130 represents a region indicating circuit for a mouse, a digitizer or a point pen. A CPU 107 converts the region indicated by the region indicating circuit 130 in vector data such as Post Script. Then, multivalued image data is read by an RGB scanner portion 101, the image, which has been thus read, being divided into data compressed in multi level and data compressed in binary in response to a color enable signal generated by a color enable generator 103.

That is, the multi level color data item is, by latches 109, 111 and 113, latched for each of colors red, green and blue before it is temporarily stored in a color image memory 117. Then, it is subjected to a multi level color image compression process in an image compression circuit 125.

On the other hand, the data item compressed in binary is latched by a latch 115. Then, when the subject region is the multi level color data region, "0" is inserted into the latched data item by a blank data insertion circuit 116 and a selector 119 which is arranged to operate in response to a color enable signal. Then, the data item inserted blank data and being compressed in binary is binarized so that it is, as binary data, stored in a binary image memory 123. The value of the binary image stored in the binary image memory 123 is encoded in accordance with a binary coded method such as MH, MR and MMR, or color binary coded method such as Q coder by a binary encoding circuit 127.

The above-described two data items, which have been respectively compressed and encoded by the color image compression circuit 125 and the binary encoding circuit 127, are transmitted by a communication control circuit 129.

Figure 2:
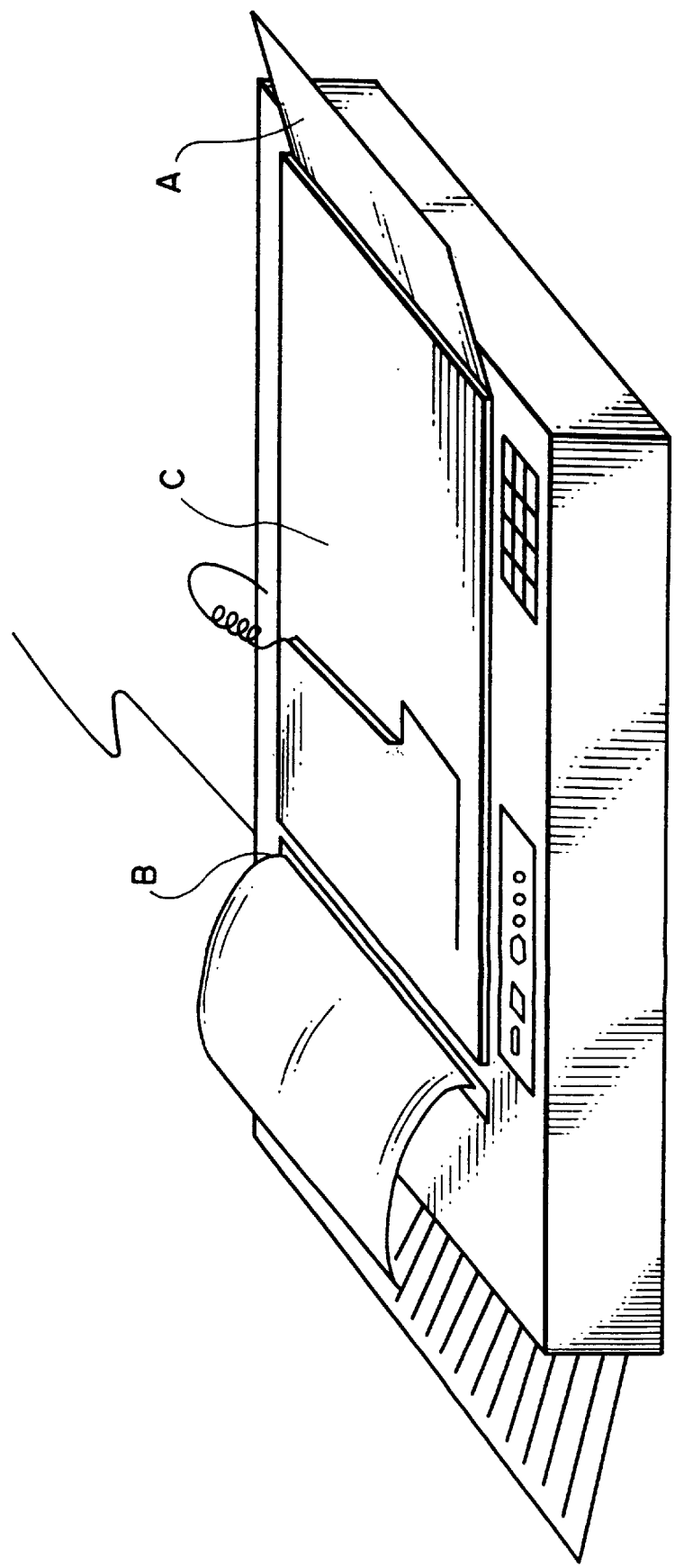
FIG. 2 is a perspective view which illustrates the shape of the apparatus shown in FIG. 1.

Then, the outline of a color facsimile machine according to this embodiment will be described with reference to FIG. 2.

The color facsimile machine according to this embodiment comprises a color data read port A, a color print output portion B and a region indicating portion C. A color original document sheet is, similarly to a black and white facsimile machine, supplied through the read port A. The original document sheet is conveyed to a read portion serving as the region indicating portion C. According to this embodiment, the read portion is arranged in such a manner that the color original document sheet is, by a user, placed below a touch panel constituting the region indicating portion C and a frame is indicated by using a pen or the like so that the frame can be indicated by a user. According to this embodiment, a frame in the original document sheet, which is being observed through the touch panel, is indicated. However, another method may be employed in which the color facsimile machine is arranged to comprise a memory and a display so that the frame is indicated on the display. Furthermore, in the case where the original document sheet is a document in which the picture portions and character portions are clearly divided from one another, the color image portions suitable for multi level compression and the character portions suitable for binary compression can automatically be divided by utilizing a so-called "image region separation" method. For example, a method can be employed in which the character portions and the picture portions can automatically be discriminated by utilizing a fact that the character portion shows a large change in the image data and the picture portion shows a reduced change. As described above, the image region and the character region are separated from each other.

Operation Procedure of the Apparatus According to this Embodiment

Figure 3:
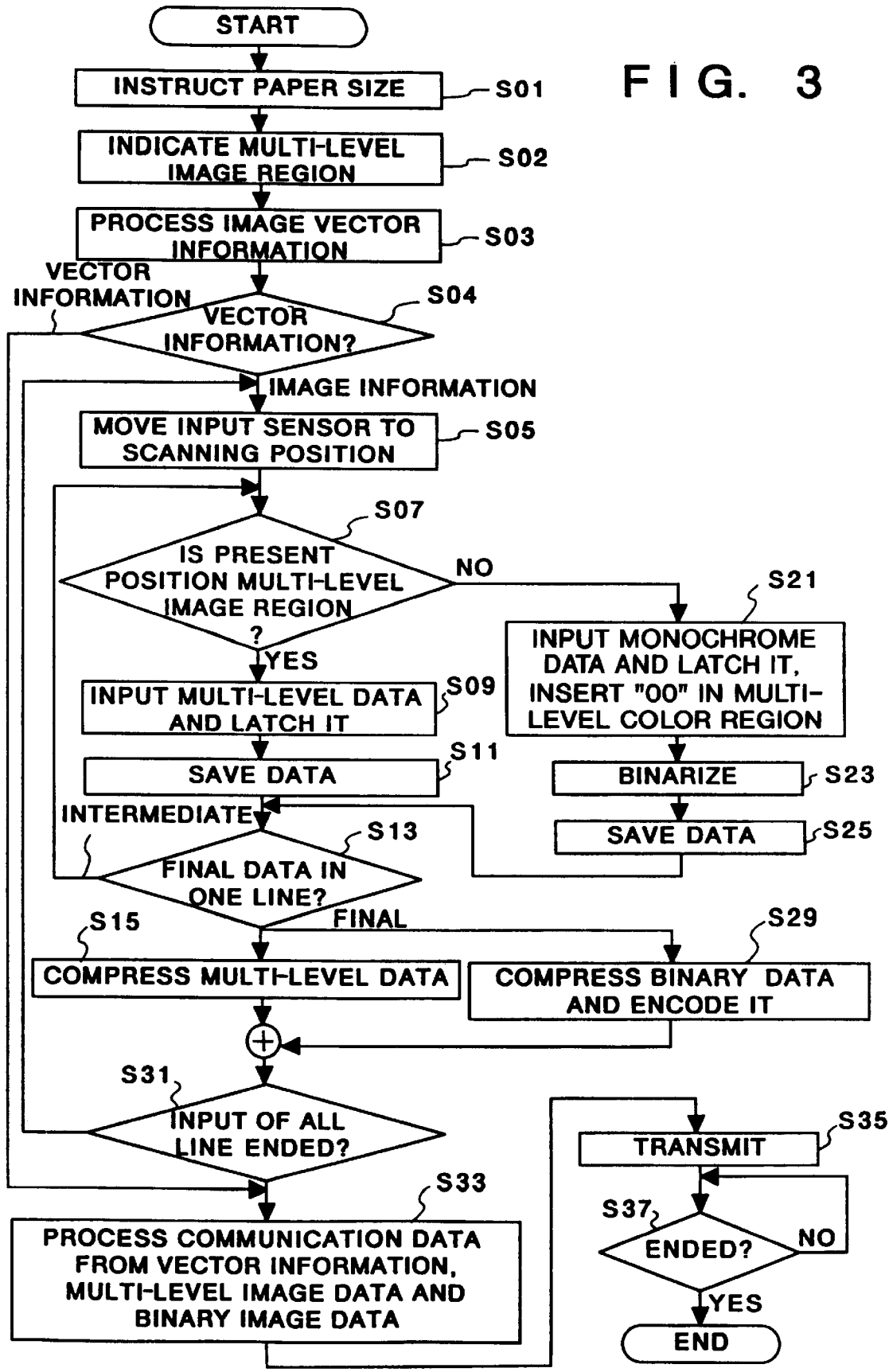
FIG. 3 is a flow chart which illustrates the operation of the apparatus according to this embodiment.

The operation procedure of the apparatus according to this embodiment will be described with reference to a flow chart of a color facsimile data processing procedure shown in FIG. 3.

According to this embodiment, the size of the paper sheet is indicated in step S01. Then, in step S02, the picture and the indicated portions in the color original document are indicated. In step S03, window vector information such as Post Script® in the indicated frame is processed. Then, in step S04, it is determined whether or not the data thus supplied contains only the vector information. If it has been determined that the supplied data does not contain only the vector information, the subject operation is the operation in which image information is transmitted. Therefore, the flow branches from step S04 to S05.

In step S05, a sensor is moved to a position of the original document sheet to be scanned. Then, in step S07, it is determined that the position, which is being scanned, is in the color image region to be compressed in multi-level or in the image region to be compressed in binary. In the case of the multi-level color image, multi-level color data is latched in step S09 before it is saved in the multi-level color image memory in step S11. If it has been determined in step S07 that the position, which is being scanned, is in the binary image region, the color data item compressed in binary is latched in step S21. If the same is in the multi-level color image region, "00" data or "FF" data is inserted as a blank data. Then, a binarization is performed in step S23, and the result is then saved in the binary image memory in step S25.

In step S13, it is determined whether or not the saved data is the final data item in one line. If it has been determined that it is the final data, the flow advances to step S15 in which the multi-level color data item is compressed before the binary compression and encoding are performed in step S29.

In step S31, it is determined whether or not data about all of the lines in one page of the original document has been processed. If it has been determined that the data processing of all of the lines has not been ended, the flow returns to step S05 in which the sensor is moved to the next scanning position so as to again perform the above-described processes. If it has been determined that the data processing of all of the lines has been ended, vector information, multi-level color image information and binary image data are transmitted in steps S33 to S37.

Setting of Image Region Information

Then, a method of processing image data about an original which is the image in which the picture portion and the character portion must be separated from each other will be described.

As described above, the picture portion in one color original document is indicated with a frame. The information about the frame thus indicated is necessary to separate the multi-level color image data including intermediate tone and the binary image data including characters in the image from each other. Furthermore, it must be decoded on the receipt side of the color facsimile machine. Therefore, the frame information as well must be transmitted to the receipt side.

Figure 4A:
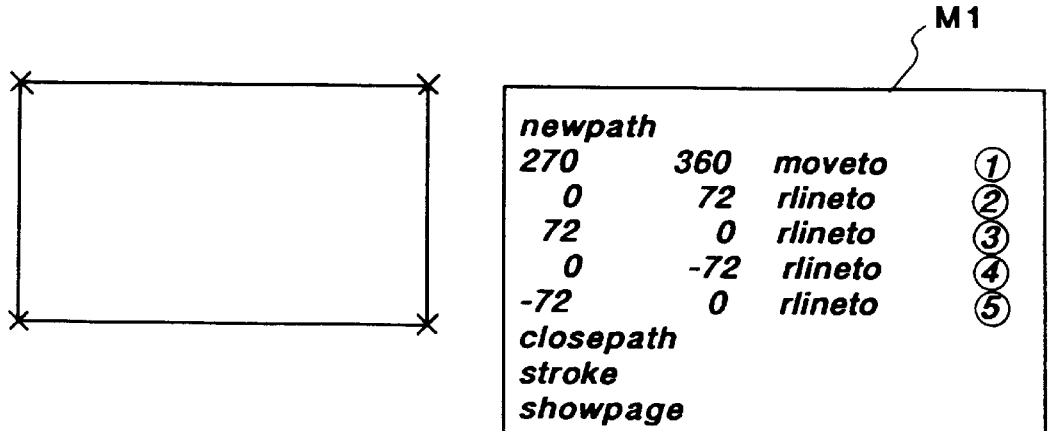
FIGS. 4A and 4B respectively illustrate the program of a BOX type window and that of a circular window.
Figure 4B:
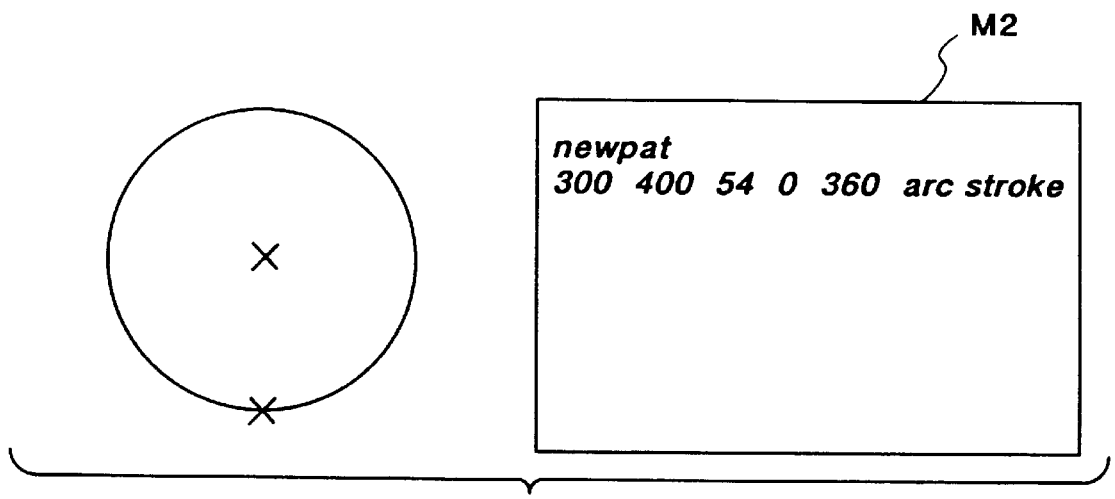
Figure 5A:
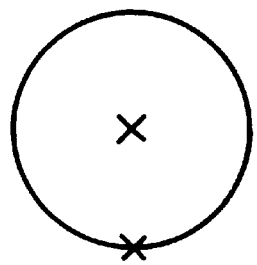
FIGS. 5A, 5B, 5C and 5D illustrates other examples of the window.
Figure 5B:
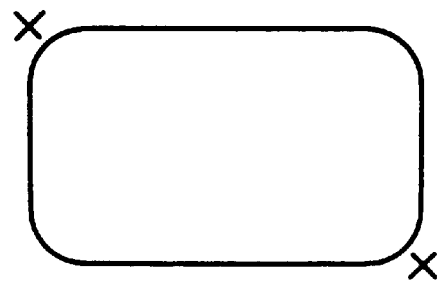
Figure 5C:
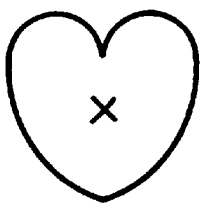
Figure 5D:
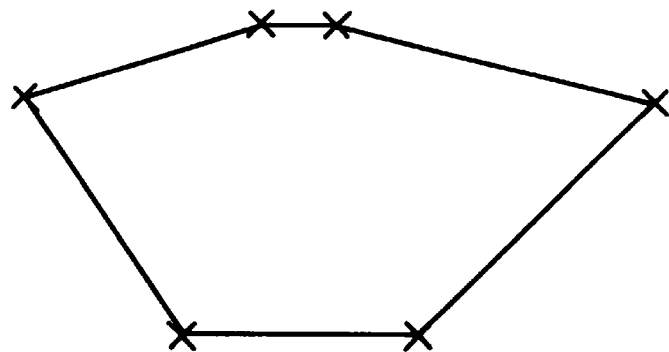

FIGS. 4A and 4B show program information about Post Script® as an example of window information which is information about the instructed frame.

For example, in order to, as shown in FIG. 4A, express the size of the frame of a BOX type window, vector data expressed by indicated program data ②③④ and ⑤ displayed, as shown in M1, on a monitor can be used. Furthermore, the position of the BOX type window can be freely indicated by changing data expressed by ① shown in the drawing.

FIG. 4B illustrates the frame of a circular window. In the case of using Post Script®, a circular window can be expressed by an indicated program data displayed on a monitor as shown in M2, that is, by data for one line.

The transmission side has no need to directly write the program of the type described above, information written by a pen or the like can be converted into program information shown in FIG. 4. The receipt side of the color facsimile apparatus prints the image while arranging the pictures and the characters in accordance with the thus converted information.

Although the description according to this embodiment is made about Post Script®, which is usually used in a printer or the like, as the frame information, the present invention is not limited to the method in which vector information is processed. Another method may be employed.

FIG. 5 illustrates a variety of frames. These frames can be processed by indicating the position and the type of the frame.

An optional frame can be easily drawn at an optional position by instructing the desired point as usually used in a picture drawing software for a personal computer.

Reading of Original Document

Figure 6:
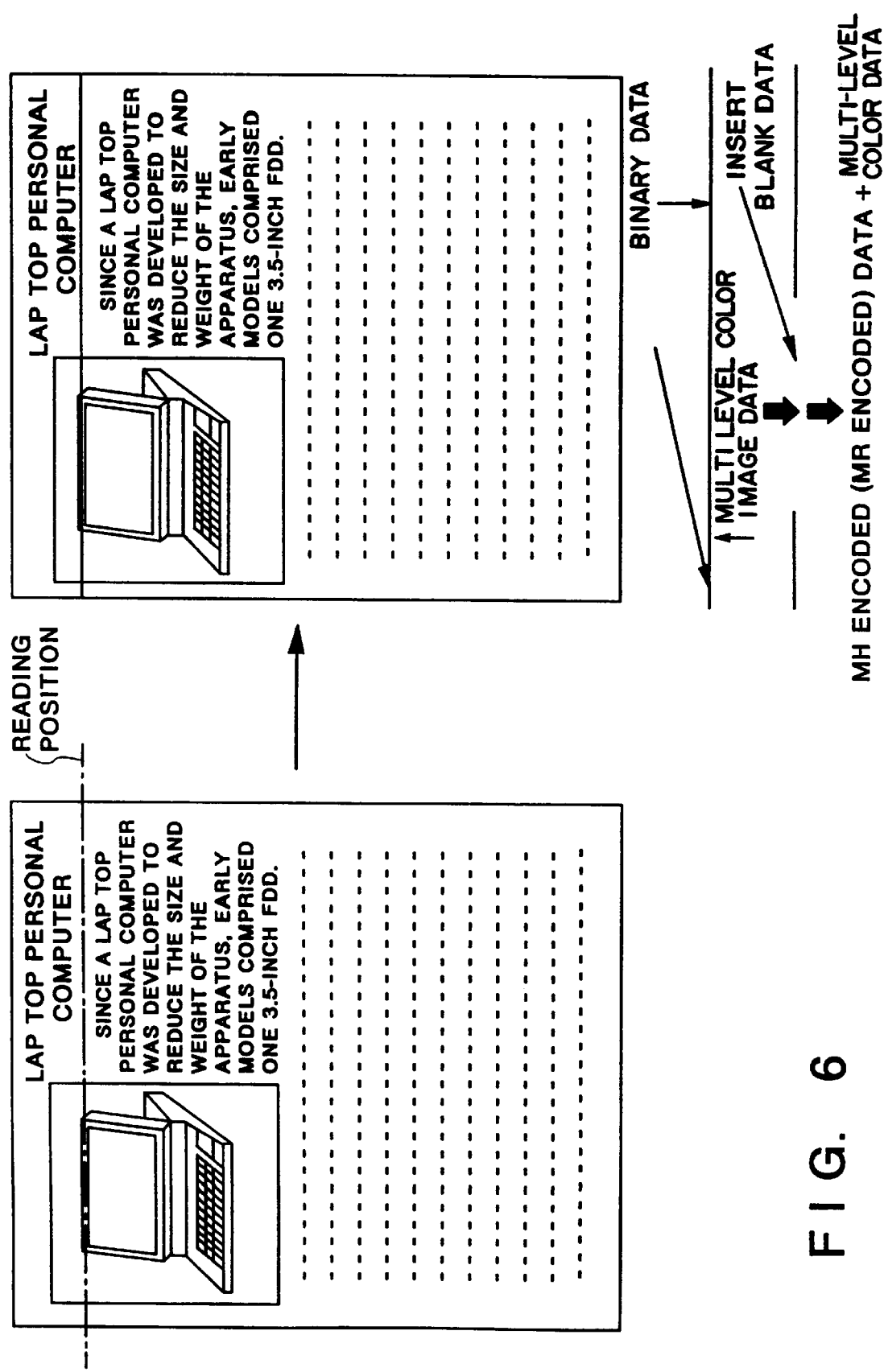
FIG. 6 illustrates the relationship between the position of the original document at which it is read and data.

FIG. 6 illustrates the relationship between the position at which the original document is read and data. In the case where the portion of a document to be read includes both a picture and a character portion, image data includes both binary data and multi-level color image data in a mixed manner. According to this embodiment, only the color image data is extracted from all of the data item and white data is inserted as an alternative to the extracted color image data. As a result, pictures and portions composed by character and others can be separated from one another when a color original document is transmitted by a color facsimile machine. That is, the picture portion is processed as color multivalued data capable of expressing the halftone image, while the character portion is processed as small-value data such as binary data or quadruple data. As a result, the quantity of the image data to be transmitted can be reduced.

Figure 7:
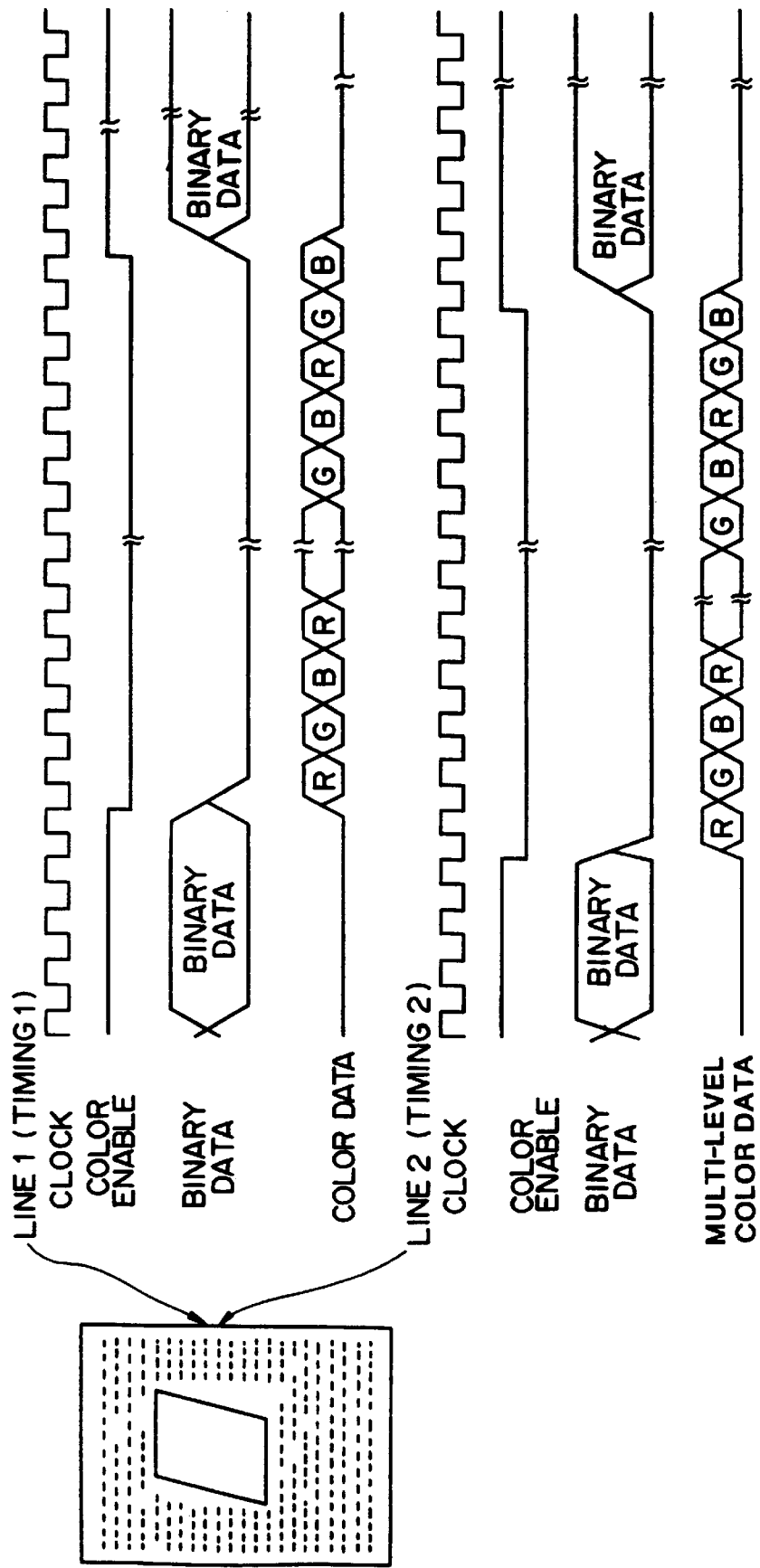
FIG. 7 is a timing chart for reading a color original document to be read by the apparatus shown in FIG. 1.

FIG. 7 is a timing chart for reading a color original document, wherein a case in which a frame contains a diagonal portion such as a parallelogram will be described.

The timing at which an original at a position designated by a line 1 is read is shown as timing 1. Image data read at the timing of a reading clock is divided into a binary data portion and a multi-level color data portion in response to a color enable signal generated by frame indication vector signal. The blank data "0" or "1" is inserted into binary data during the time in which the multi-level color data is selected by the color enable signal.

A line 2 is the next line of the line 1 which is divided in such a manner that the color enable region is, as shown in FIG. 7, shifted by one pixel from the line 1 since the indicated frame is in the form of a parallelogram according to this embodiment.

Figure 8:
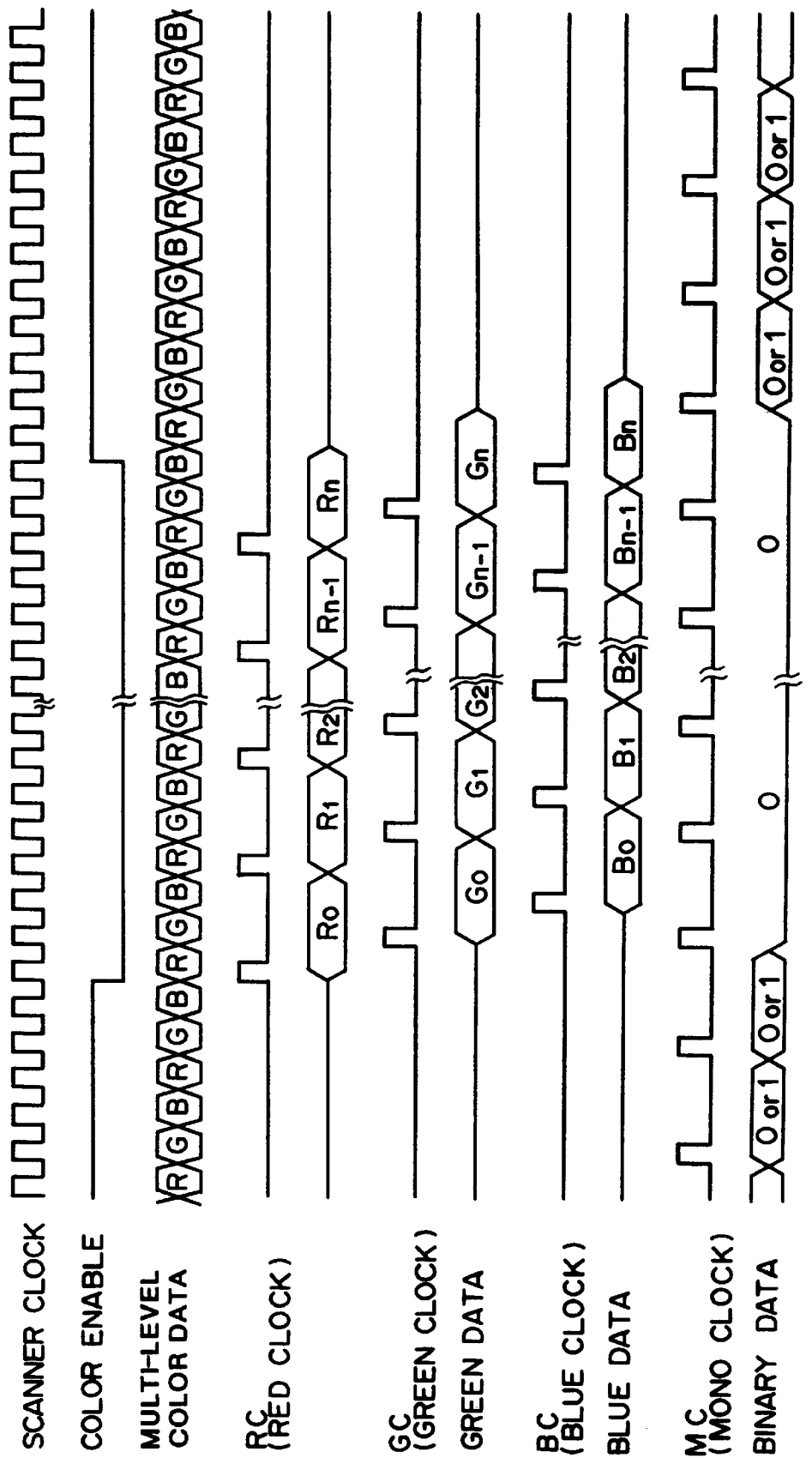
FIG. 8 is a timing chart which illustrates the operation of the apparatus shown in FIG. 1.

FIG. 8 illustrates a timing chart for dividing data to latches 109, 111, 113 and 115 of the apparatus shown in FIG. 1.

Transmission of Image Data

FIG. 9 illustrates a status where image data is transmitted in such a manner that it is divided into color image data and character data. In this case, there is a necessity in that the above-described three types of data are divided and collectively transmitted regardless of the sequential order in which it is transmitted.

Example of Transmission According to this Embodiment

An example of the transmission performed by a color facsimile machine will be described.

Figure 10A:
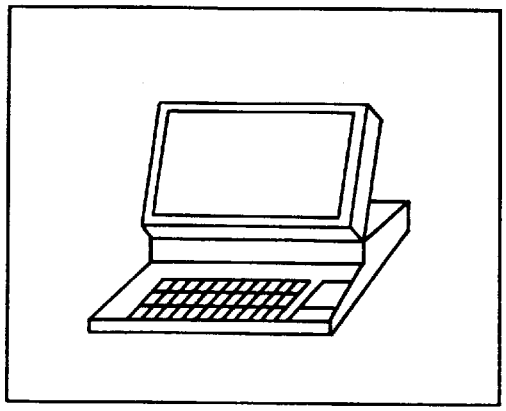
FIGS. 10A to 10C respectively illustrate the operation according to the embodiment of the present invention.
Figure 10B:
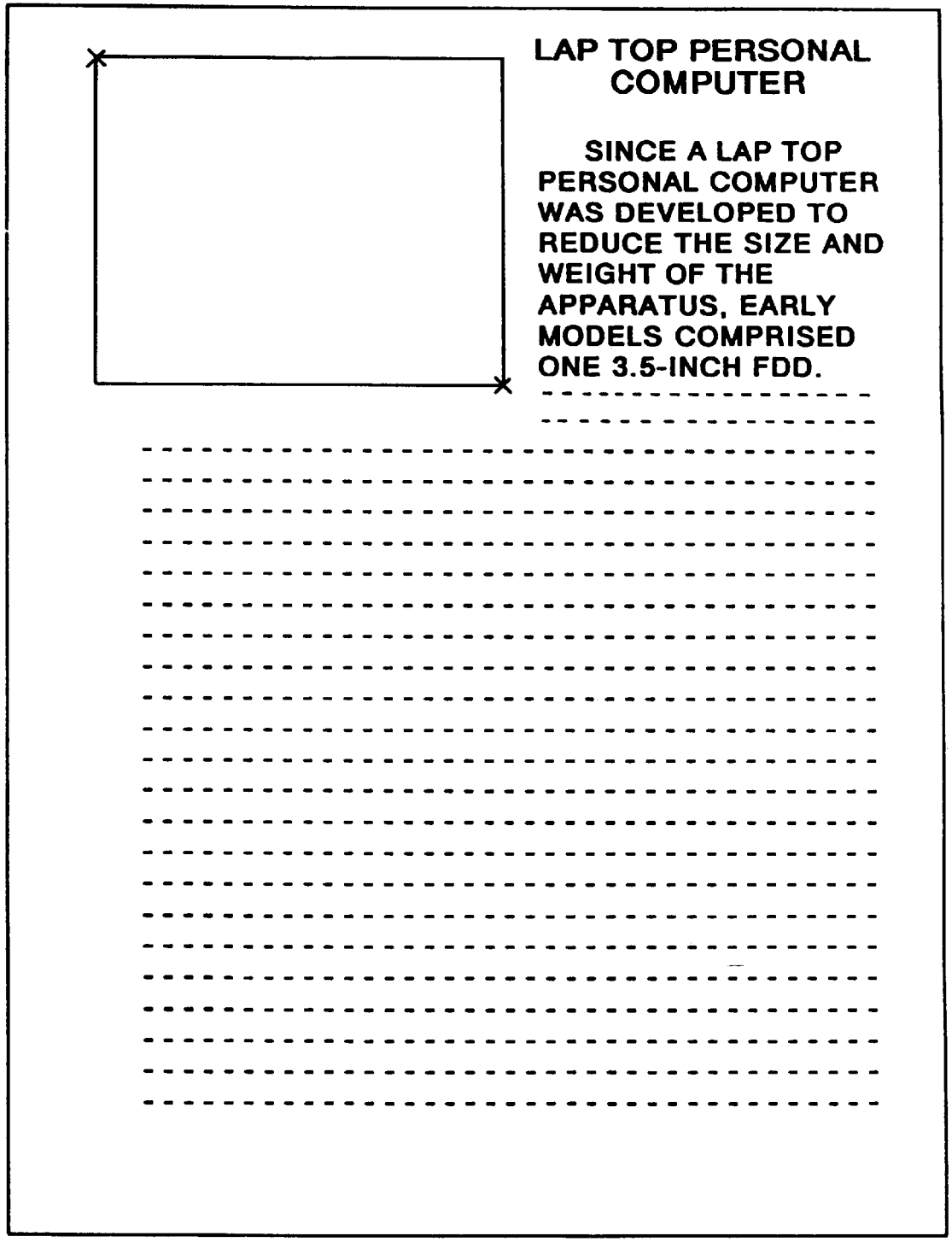
Figure 10C:
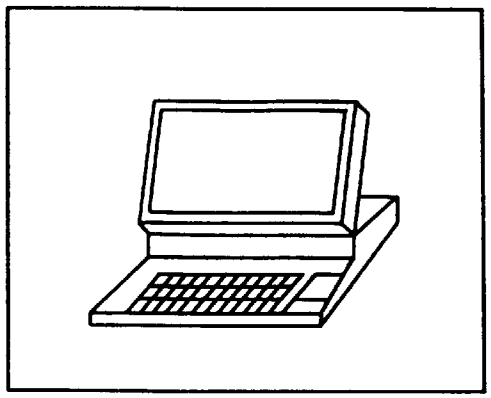

FIG. 10A illustrates an example of the image original document which contains both characters and a color image. According to this embodiment, the color image portion is indicated as shown in FIG. 10B. In this case, the picture region is indicated by a rectangular frame. FIG. 10C illustrates an image formed by extracting only the color image portion. As shown in FIG. 10C, a picture portion is indicated so that a picture and a character portion are separated from each other. The above-described indication may be performed manually, but as an alternative to this, a structure may be employed in which the indication is made in such a manner that the color image portion and the characters are automatically recognized by the apparatus. Although the rectangular frames are illustrated in FIGS. 10B and 10C, the present invention is not limited to this.

In the case where there arises a desire of deleting a portion in the color image or a case in which only a portion in a small frame is necessary, a double frame indication must be performed.

Figure 11B:
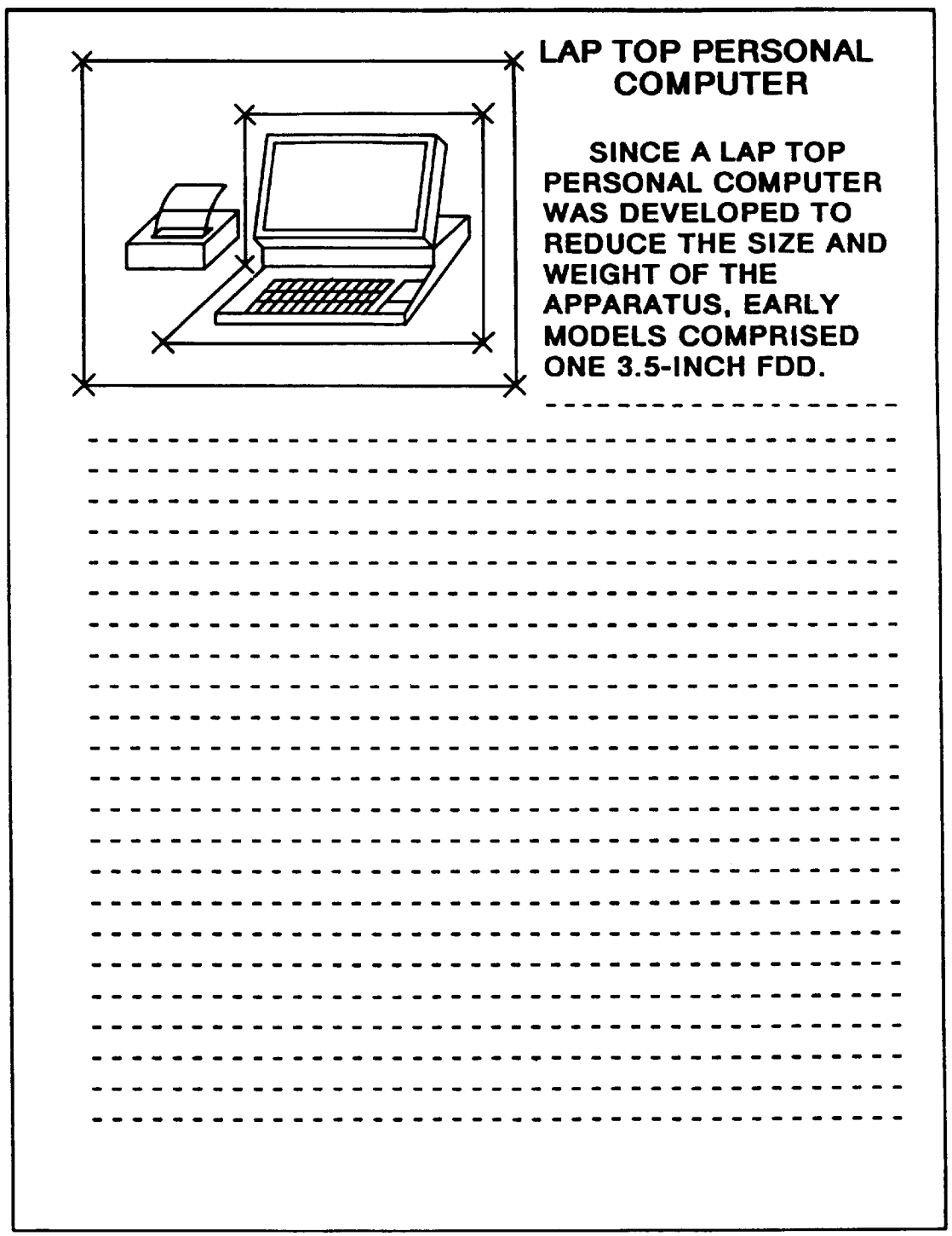
Figure 11C:
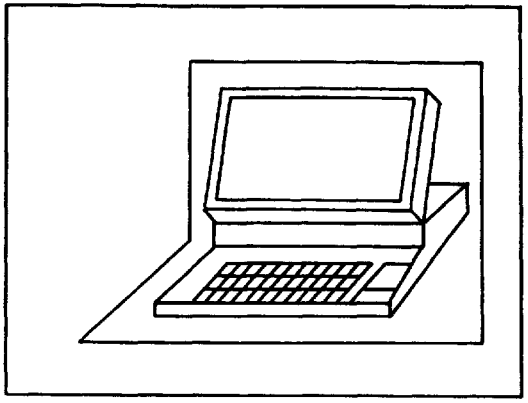
Figure 11D:
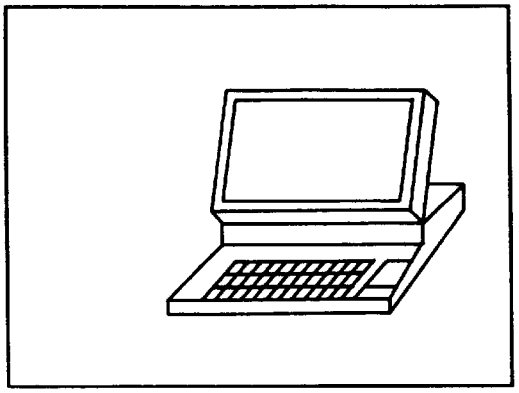

Referring to FIG. 11, FIG. 11A illustrates an original document containing both characters and a color image. In the case where only a portion of a color image of the original document shown in FIG. 11A is necessary, both the outer frame and the inner frame of the color image are indicated. In the method shown in FIG. 11B, a case is illustrated in which only the picture of a lap top personal computer is necessary but the picture of the printer is not necessary. FIG. 11C illustrates a case where an image from which an unnecessary color image has been deleted is transmitted. Actually, the illustrated image data is transmitted as facsimile machine data. Therefore, a final image printed as shown in FIG. 11D can be obtained in the receipt side.

As described above, according to this embodiment, only data about a necessary region is indicated and transmitted as an alternative to transmitting the overall area of the color image data. FIG. 11 illustrates the case where there is a picture which is desired to be deleted. According to this embodiment, a double frame indication is performed in order to prevent a problem taking in place in that the unnecessary picture portion is read as character data in a case where the picture portion has a large marginal area or in a case where an unnecessary portion is desired to be deleted.

Then, the operation at the time of the data transmission will be described with reference to FIG. 12.

Figure 12A:
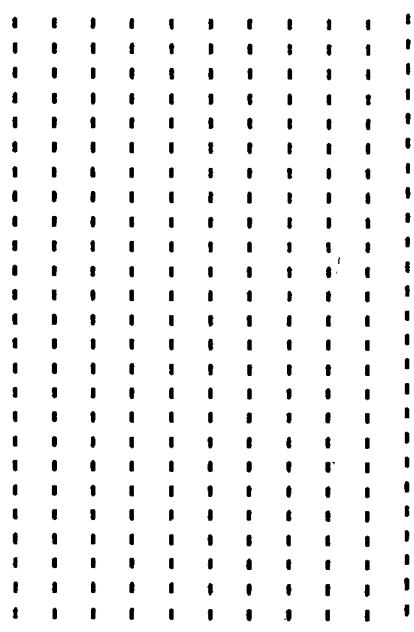

FIG. 12A illustrates the processing of data of a character portion.

According to this embodiment, color image data about the original document is cut off and masked so as to insert "blank data". Actually, "0" or "1" is inserted into the masked portion. Then, the image data about the image to which the blank data has been inserted as an alternative to the color image is compressed by an encoding method, for example, MH, MR or MMR encoding method. In the case where the MH, MR and MMR encoding methods, the compression efficiently is improved in proportion to the quantity of the blank data. Furthermore, the insertion of the blank data as an alternative to the color image will cause the receipt side of a facsimile machine to automatically make a color image region.

FIG. 12B illustrates the process of data about the color image portion. According to the process described above, the color image data is limited to only the portion in the inner frame and the frame is individually stored as vector information in the CPU. Therefore, even if an image is deformed as shown in FIG. 12B, it can be subjected to the color image compression process. As the method of compressing the color image data of the type described above, an orthogonal conversion method, a vector quantization method and a method including the above-described two methods may be employed.

As described above, according to this embodiment, a color original document is temporarily read by the RGB scanner before the binary image portion and the multi-level color image portion are, as described above, separated from each other so as to be individually transmitted. Therefore, the color image data and the image data composed by characters and others can be efficiently compressed, causing the necessary time to complete the data transmission to be significantly shortened.

According to this embodiment, also, the data composed by character and others is read by the scanner which is capable of reading the RGB color data so that the black and white character data and the color data are distinguished from each other. However, in a case where the scanner portion is structured to comprise an optical system arranged to exclusively read black and white or monocolor character data, accurate character data can be obtained so as to be printed. Therefore, a CCD on which a color filter is mounted is employed in the reading portion so as to read color data. Furthermore, a structure may be employed which is arranged to further comprise a scanner by using a CCD having no color filter so as to read monochromatic data. In this case, a sensor arranged to be capable of sensing black and white or monocolor image is necessary to be provided and a further system must be provided as the signal processing circuit. However, more accurate black data than that processed by the RGB scanner can be obtained. Specifically, a structure may be employed which is arranged in such a manner that a black and white character data reading portion is provided for the RGB scanner portion 101.

As described above, according to the procedure for transmitting data by using a color facsimile machine, a picture portion and a character portion are individually processed when a color image is transmitted. Therefore, the data compression can be efficiently performed depending upon the characteristics of the two types of the data items. Therefore, the necessity of transmitting an excessively large quantity of data can be eliminated at the time of the color facsimile transmission. Furthermore, the data compression efficiency can be improved by inserting blank data into a portion which has been determined to be a picture in the character portion. In addition, a procedure for making the above-described portion can be eliminated. The character portion is, similarly to the conventional black and white facsimile machine, processed as character image data so that the procedure of converting the characters into codes can be eliminated. Therefore, the character portion can be simply processed. As described above, the color data and the black and white or monocolor data can be transmitted while mixing at the time of transmitting data by a color facsimile machine.

According to this embodiment, only the positional information about the color image portion is transmitted as vector information as shown in FIG. 9 when color image portions and binary image portions are successively transmitted. However, only positional information about the binary image portion may be transmitted or positional information about the two types of the positions may be transmitted. The above-described positional information is not limited to the vector information. As an alternative to this, a method may be employed in which coordinates are simply transmitted.

As described above, according to the present invention, information including color images can efficiently be transmitted.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image encoding apparatus, for encoding an original image composed of a multi-level image having multiple levels and a binary image having binary levels, comprising:

designating means for designating first and second areas of the original image, each of the first and second areas corresponding to a part of the original image;

first encoding means for encoding image information of the multi-level image in the first area of the original image; and second encoding means for encoding image information of the binary image in the entire area of the original image, with multi-level color information located in the first and second areas being removed from the image information to be encoded by said second encoding means.

2. An image encoding apparatus according to claim 1, wherein said first encoding means encodes the image information by using an orthogonal transformation.

3. An image encoding apparatus according to claim 2, wherein said first processing means encoded the image information by using an ADCT method.

4. An image encoding apparatus according to claim 1, wherein said second encoding means encodes the image information by using a MMR method.

5. An image encoding apparatus according to claim 1, further comprising output means for serially outputting encoded image data including encoded image information encoded by said first and second processing means.

6. An image encoding apparatus according to claim 5, wherein the multi-level color information is withdrawn from being output by said output means.

7. An image encoding apparatus according to claim 1, further comprising scanning means for scanning the original image to obtain the image information thereof to be encoded, and wherein said first and second encoding means executes their process in a unit of an area extending in a direction in which said scanning means scans.

8. An image encoding method for encoding an original image composed of a multi-level image having multiple levels and a binary image having binary levels, comprising steps of:

designating first and second areas of the original image, each of the first and second areas corresponding to a part of the original image;

encoding image information of the multi-level image in the first area of the original image; and encoding image information of the binary image in the entire area of the original image, with multi-level color information located in the first and second areas being removed from the image information to be encoded by said second encoding means.

9. An image encoding method according to claim 8, wherein the multi-level image is encoded by using an orthogonal transformation.

10. An image encoding method according to claim 9, wherein said the multi-level image is encoded by suing an ADCT method.

11. An image encoding method according to claim 8, wherein the binary image is encoded by using a MMR method.

12. An image encoding method according to claim 8, further comprising a step of serially outputting the encoded binary image data and the encoded multi-level image data.

13. An image encoding method according to claim 12, wherein the multi-level color information is withdrawn from being output in said outputting step.

14. An image encoding method according to claim 8, further comprising a step of scanning the original image to obtain the image information thereof to be encoded, and wherein encoding is executed in a unit of an area extending in a direction in which the original image is scanned.

* * * * *

UNITED STATES PATENT AND TRADEMARK OFFICE
CERTIFICATE OF CORRECTION

PATENT NO. : 5,937,099
DATED : August 10, 1999
INVENTOR(S) : MAKOTO TAKAOKA

It is certified that error appears in the above-identified patent and that said Letters Patent is hereby corrected as shown below:

ON THE TITLE PAGE [56] Reference Cited:

U.S. PATENT DOCUMENTS, insert:

--4,630,124  12/16/86  Endoh et al.         358  260
  4,654,484  03/31/87  Reiffel et al.       379   53
  4,703,362  10/27/87  Deutermann et al.    358  263
  4,829,385  05/09/89  Takezawa             358  260
  4,845,569  07/04/89  Kurahayashi et al.   358  400
  4,953,013  08/28/90  Tsuji et al.         358   75
  5,107,345  04/21/92  Lee                  358  432
  5,121,216  06/09/92  Chen et al.          358  261.3--

SHEET 6:

Figure 6, "MULTILEVEL" should read --MULTI-LEVEL--.

COLUMN 2:

Line 18, "be" should be deleted;
Line 33, "illustrates" should read --illustrate--;
Line 50, "multi level" should read --multi-level--;
Line 62, "in" should read --into--,"data" should read --data using, e.g., a well known language--, and "Script." should read --Script®.--; and
Line 65, "multi level" should read --multi-level--.

UNITED STATES PATENT AND TRADEMARK OFFICE
CERTIFICATE OF CORRECTION

PATENT NO. : 5,937,099

DATED : August 10, 1999

INVENTOR(S) : MAKOTO TAKAOKA

It is certified that error appears in the above-identified patent and that said Letters Patent is hereby corrected as shown below:

COLUMN 3:

Line 1, "multi level" should read --multi-level-- and "item" should be deleted;
    Line 4, "multi level" should read --multi-level--;
    Line 6, "item" should be deleted;
    Line 8, "multi level" should read --multi-level--;
    Line 9, "item" should be deleted;
    Line 11, "item inserted blank data and" should read --so processed--;
    Line 12, "being compressed in binary" should be deleted;
    Line 17, "127." should read --127 (such methods are examples of arithmetic-encoded (methods).--;
    Line 45, "multi level" should read --multi-level--; and
    Line 52, "reduced" should read --reduced (i.e., smaller)--

COLUMN 4:

Line 18, "as a" should read --as--.

COLUMN 6:

Line 43, "taking in place" should read --taking place--;
    Line 58, "where the" should read --of the--;
    Line 60, "efficiently" should read --efficiency--.

UNITED STATES PATENT AND TRADEMARK OFFICE
CERTIFICATE OF CORRECTION

PATENT NO.   : 5,937,099
DATED        : August 10, 1999
INVENTOR(S)  : MAKOTO TAKAOKA It is certified that error appears in the above-identified patent and that said Letters Patent is hereby corrected as shown below:

COLUMN 9:

Line 15, "said" should be deleted and "suing" should read --using--.

Signed and Sealed this

Twenty-ninth Day of August, 2000

Attest:

Q. TODD DICKINSON

*Attesting Officer*      *Director of Patents and Trademarks*